Aug. 24, 1965 W. S. THOMAS, JR., ETAL 3,202,772

MAGNETIC TRANSDUCER ASSEMBLIES

Filed Feb. 2, 1962 2 Sheets-Sheet 1

INVENTORS
RAYMOND J. STANKIEWICZ
WALTER S. THOMAS JR.

BY William G. Miller Jr.
AGENT

MAGNETIC TRANSDUCER ASSEMBLIES

Filed Feb. 2, 1962

United States Patent Office 3,202,772
Patented Aug. 24, 1965

3,202,772

MAGNETIC TRANSDUCER ASSEMBLIES

Walter S. Thomas, Jr., Drexel Hill, and Raymond J. Stankiewicz, Philadelphia, Pa., assignors to Sperry Rand Corporation, New York, N.Y., a corporation of Delaware Filed Feb. 2, 1962, Ser. No. 170,705
2 Claims. (Cl. 179—100.2)

This invention relates to recording heads which are maintained in a constant close spaced relationship to a moving record medium by the establishment of a hydrodynamic bearing between the recording head and the record member. More particularly this invention relates to a novel mounting arrangement for magnetic recording heads which are mounted in hydrodynamic bearing relationship to a moving record surface.

It has previously been the practice to mount magnetic recording heads in gimbal mounts to provide the necessary degrees of freedom to allow the recording head to conform to the moving record surface as it flies over the surface on a hydrodynamic fluid bearing film such as air. These mounts, however, have been expensive and difficult to fabricate. It is therefore an object of this invention to provide a more easily constructed and less expensive mounting for such flying heads.

A further object of this invention is the provision of a flying head mount of improved reliability and longer life.

A still further object of this invention is the provision of a lighter head mounting to improve its frequency response.

A further object of this invention is the provision of a flying head mounting which provides a high level of dynamic stability.

A still further object of this invention is the provision of a flying head mounting having the same degrees of freedom as a gimbal mount.

The foregoing objects and other novel features of this invention will become more apparent from the following detailed specification taken in conjunction with the drawings in which.

In accordance with this invention there is provided an assembly for maintaining a recording head in close hydrodynamic bearing relationship to a record surface during relative motion between the head and the record surface. This assembly has a loading arm having one end attached to a support member with its opposite end free for movement toward and away from the record surface. A force is applied to the loading arm to bias the free end of the arm toward the record surface. The head unit has a hydrodynamic bearing surface facing the record surface and a first pivot bearing surface on the opposite side of the head unit from the hydrodynamic bearing surface. A second pivot bearing surface is located on the loading arm and forms with the first pivot bearing surface a universal pivot element which is operative to transmit the force applied to the loading arm to the head unit while allowing the head unit to pivot as necessary to follow variations in the record surface. The head unit is coupled to the loading arm by a flat spring element. The portion of the flat spring element adjacent to the area over which it is attached to the head unit lies in a plane generally parallel to the hydrodynamic surface of the head unit and intersecting the area of contact between the first and second pivot bearing surfaces so that head unit has a maximum amount of freedom to pivot about all axes except that perpendicular to the hydrodynamic bearing surface of the head unit.

Figure 1:
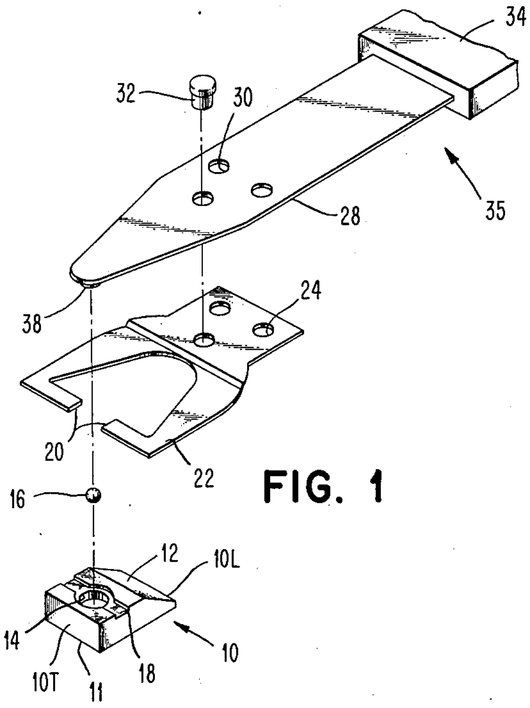
FIGURE 1 is an exploded view of the novel head mounting.

The exploded view of FIGURE 1 shows the details of a preferred embodiment of the novel head mounting of this invention. In FIGURE 1 a head unit shown as 10 is formed by casting an epoxy resin to encapsulate the magnetic recording head elements (not shown). This head unit 10 has along its underside an area, not visible in this figure, which may have a cylindrical or flat hydrodynamic bearing surface in dependence upon the type of record medium with which it is to be used. In that surface the recording and reading gaps of the magnetic heads are positioned as may be required to provide the necessary transducer relationship between the head elements themselves and the associated magnetic recording surfaces. As shown in FIGURE 1, the head unit 10 has a circular depression 14 in the surface opposite the hydrodynamic bearing surface. Within the circular depression 14 the ball 16 is cemented or fixed in some suitable manner to form a surface on which the head unit 10 may pivot.

The head unit 10 also includes a rabbet 18 cut from one side of head unit 10 to the other side. The rabbet 18 is designed to receive the tab portions 20 of suspension spring 22. Spring 22 is preferably of very light spring metal and has holes 24 drilled therein for utilization in coupling the suspension spring 22 to loading spring 28.

Loading spring 28 is a flat spring which would be generally heavier than spring 22. Spring 28 has a group of three holes 30 which in cooperation with the holes 24 of suspension spring 22 receive eyelets 32 which firmly couple the suspension spring 22 to the loading spring 28. Loading spring 28 is firmly imbedded in arm 34 so that the arm 34 and loading spring 28 together form a loading arm 35. At the free end of loading spring 28 a flat button 38 is affixed to the underside at a location such that the lower flat surface of the button 38 forms another pivot bearing surface which is normally maintained in contact with ball 16 by the bias of suspension spring 22 to thereby establish a universal pivot element which will serve to transmit any forces from the loading spring 28 to the head unit 10 while still allowing the head unit 10 to pivot with freedom about all axes except the axis perpendicular to the hydrodynamic surface of head unit 10 and through the area of contact between the pivot elements 16 and 38. Head unit 10 will thus not be allowed to move in a plane parallel to the plane of suspension spring 22 since suspension spring 22 has sufficient rigidity along that plane to prevent such movement.

Normally the tabs 20 of suspension spring 22 are cemented in the rabbet portion 18 of head unit 10 as by an epoxy cement and the tabs 20 in their cemented positions in head unit 10 are designed to lie in a plane which is substantially parallel to the hydrodynamic bearing surface of unit 10 and intersects the area of contact between pivot element 16 and pivot element 38. This orientation of the suspension spring 22 and the pivot elements 16 and 38 allows any pivoting of the head unit with respect to the loading spring 28 to take place with a minimum of sliding friction between the pivot elements 16 and 38 thus reducing any fretting of these pivot elements when the head unit 10 is subjected to high frequency movements.

Figure 2:
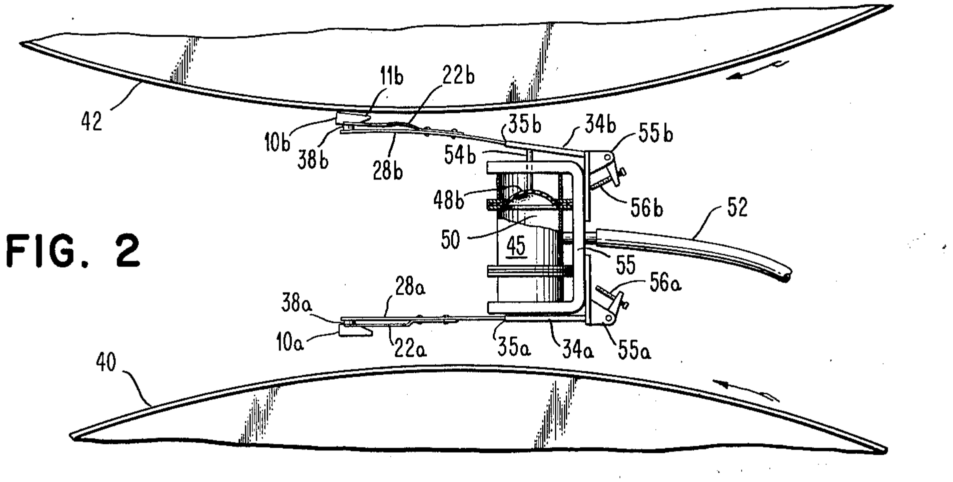
FIGURE 2 illustrates an assembly of the novel flying head mounting of FIGURE 1 in a dual drum memory.

In FIGURE 2 the head structure shown in FIGURE 1 is illustrated in an assembly which utilizes two drum recording surfaces 40 and 42. In this figure magnetic recording head units 10*a* and 10*b* are shown as being associated with the separate drum recording surfaces 40 and 42, respectively. The mounting assembly for the head units 10*a* and 10*b* are similar to those shown in FIGURE 1 and like parts carry similar reference numerals with those associated with the head unit 10*a* carrying the suffix "*a*" and those associated with the head unit 10*b* including the suffix "*b*."

For convenience of illustration the head unit 10*a* is shown in the retracted position that is the position which it would occupy when the head elements are neither reading nor recording on the recording surface 40. The head unit 10*b* is shown in the dynamic position with respect to record surface 42 which provides a close but spaced relationship. It will be understood that normally heads 10*a* and 10*b* will both be either in the static, non recording position as shown by head unit 10*a* or in the dynamic, recording position illustrated by head unit 10*b* at the same time.

The loading arms 35*a* and 35*b* are mounted to pivot on pivots 55*a* and 55*b*, respectively with respect to frame 55 which mounts actuator 45. The loading arms 35*a* and 35*b* are acted on by opposite sides of pneumatic actuator 45 which serves to force the loading arms 35*a* and 35*b* to overcome a spring not shown which tends to maintain arms 35*a* and 35*b* in the static position shown for head unit 10*a*. The arms are thus moved to a deflected position as shown for arm 35*b*. This deflected position maintains head units 10*a* and 10*b* biased toward their respective record surfaces 40 and 42 so that the recording head units 10*a* and 10*b* are both placed into a recording position with respect to the recording surfaces 40 and 42 as illustrated in FIGURE 2 by head unit 10*b*. As is shown by the cut away portion of the actuator 45, this positioning of arm 35*b* is accomplished by actuation of diaphragm 48*b* in response to the introduction of compressed air into chamber 50 by way of the tubing 52 which connects the chamber 50 to an external pressure source which may be selectively utilized. The positioning of arm 35*a* is accomplished in similar fashion. The diaphragm 48 transmits the loading force through pin 54*b* to arm 34*b* of loading arm 35*b* and through loading spring 28*b* and its respective pivot elements including the button 38*b* to the head unit 10*b*. This force is effective to move the head unit from a static position, similar to that shown for head unit 10*a* to a dynamic position as shown for head 10*b*. The amount of this force is determined by the spring constant of loading spring 28*a* and 28*b* as well as the final angular position of arms 34*a* and 34*b*. This final position is determined by the adjustment of stop screws 56*a* and 56*b*, respectively.

In moving head unit 10*b* toward the recording surface 42 the hydrodynamic bearing surface 11*b* of head unit 10*b* approaches the recording surface 42 trailing edge first. As the head unit 10*b* approaches record surface 42 there is formed between the hydrodynamic bearing surface 11*b* and the recording surface 42 an air wedge by virtue of the high velocity air traveling with the record surface 42 in the direction shown by the arrow. This air wedge balances the loading on the head unit affected through loading spring 28*b* when the head unit 10*b* is positioned so that there is a close spaced relationship between the hydrodynamic bearing surface 11*b* and the recording surface 42. This close spacing allows the magnetic recording head element, which is normally imbedded in the head unit 10*b* near the trailing edge 10*a*, to be sufficiently close to the record surface 42 to accomplish the necessary reading and recording functions yet avoid contact with record surface 42. The head unit 10*b* is thus a flying head in the broad sense that the term is used in the art and will by virtue of its bearing relationship with the record surface 42 tend to follow variations in that surface.

As has been mentioned the suspension spring 22*b* serves to maintain the head unit 10*b* with its ball pivot element such as 16 in FIGURE 1 in contact with its pivot element 38*b* of loading arm 35*b* while allowing freedom of motion for the head unit 10*b* in all planes except those substantially parallel to the hydrodynamic bearing surface 11*b*.

Figure 3:
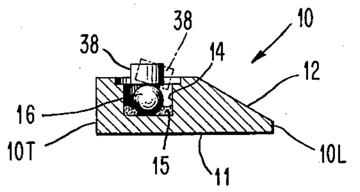
FIGURE 3 is a cross section of the head unit of FIGURE 1 showing the relationship of the pivot elements under both static and dynamic conditions.

FIGURE 3 illustrates the relative relationship between the head unit 10 which is shown in cross section and the ball 16 which is held in circular recess 14 by cement shown in this figure as 15. The upper surface of the ball 16 normally is maintained in contact with the button 38 on a flat surface thereof. In FIGURE 3 the button 38 is shown in its static position in solid line form while the dotted line position of the button 38 shows the pivoted relationship between the button 38 and the ball 16 which will exist when the head unit 10 is in its normal flying position closely spaced from the associated record medium. It should here be pointed out that the point of contact between the ball 16 and the button 38 is preferably arranged to be at a point which is distant from the trailing edge 10T of the head unit 10 a distance which is 36% of the total distance between the trailing edge 10T and the leading edge 10L. This position has been found to be one which provides the desirable dynamic stability. It will be obvious that this relationship may be varied over a considerable extent without effecting the essential operability of the head unit and suspension unit here described.

Figure 4:
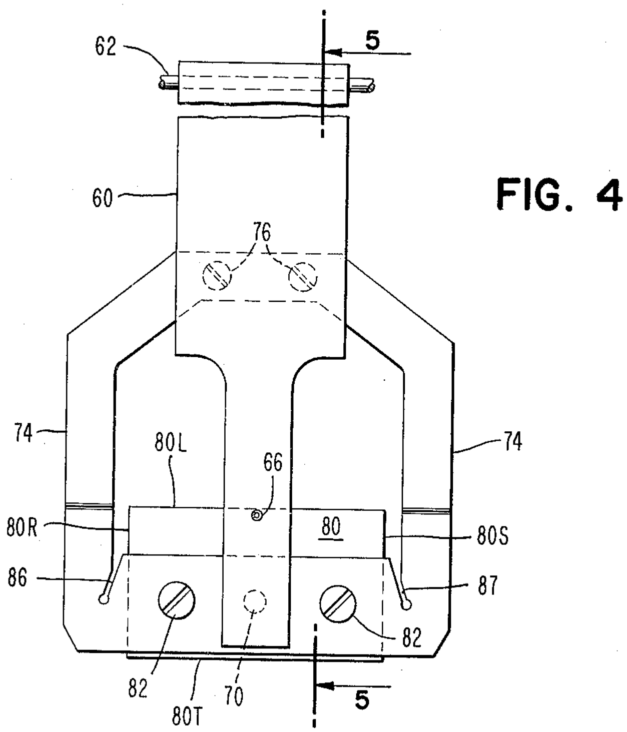
FIGURE 4 is a top view of a modification of the novel head mounting.
Figure 5:
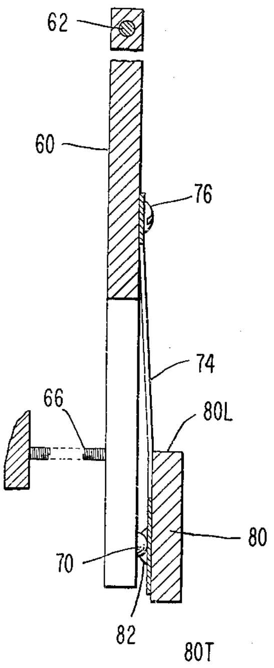
FIGURE 5 is a sectional view of the modification of FIGURE 4 taken along the line 5—5.
Figure 6:
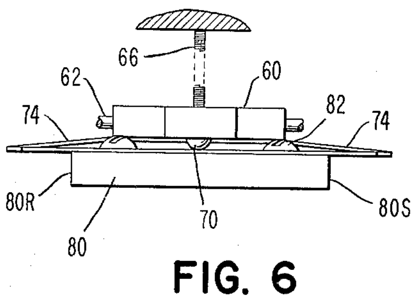
FIGURE 6 is a front view of the modification of FIGURE 4.

FIGURES 4, 5 and 6 are views of a modification of the recording head mounting assembly of FIGURE 1. In FIGURES 4, 5 and 6 like reference numerals refer to like parts. In this modification, the loading arm 60 is a rigid member which is pivoted about a pivot pin 62. Loading arm 60 is maintained biased toward any associated record surface by a compression spring 66. The force exerted by the compression spring 66 toward the associated record surface is transmitted through the pivot elements which in this case comprise a ball element 70 fixedly mounted to loading arm 60 and the flat surface along the top portion of suspension spring 74 which is connected as by screws 76 to the loading arm 60.

Suspension spring 74 is a flat spring element of very light spring metal and as is shown in FIGURE 4 is coupled in the area just adjacent the pivot elements 70 to head 80 by way of screws 82. The suspension spring 74 by virtue of the corner cuts 86 and 87 has a reduced section modulus in the suspension spring 74 along an axis which substantially intersects the point of contact between pivot elements 70 and the cooperating surface of suspension spring 74. By designing suspension spring 74 to have the reduced section modulus so oriented, the pivoting of the head 80 may follow the contours of the associated record surface with greater freedom. The effective axis about which the head unit pivots is thus definitely located as would be the case with a gimbal mount so as to increase the dynamic stability of the head units when they are in hydrodynamic bearing relationship to an associated record surface.

As with the modification of FIGURE 1 the arrangement shown in FIGURES 4, 5 and 6 is designed so that the pivot element 70 is located at a point whose distance from the trailing edge 80T of the head unit 80 is approximately 36% of the total distance from the trailing edge 80T to the leading edge 80L. The pivot element 70 is likewise centrally located as between the sides 80R and 80S thus allowing the head 80 to pivot about an axis equally spaced between the side 80R and the side 80S and through the point of contact of pivot element 70 with suspension spring 74.

Having thus described the invention what is claimed is:

1. An assembly for maintaining a magnetic recording head in close hydrodynamic bearing relationship to a record surface during relative motion between said head and said record surface comprising (a) a loading arm having one end attached to a support member and an opposite end free for movement toward and away from said record surface, (b) means for applying a force to said loading arm for maintaining said free end of said loading arm biased toward said record surface, (c) a recording head unit having a hydrodynamic bearing surface facing said record surface and a first pivot bearing surface on said head unit opposite said hydrodynamic bearing surface, (d) a second pivot bearing surface on said loading arm being oriented to form with said first pivot bearing surface a single universal pivot element operative to transmit said force applied to said loading arm to said head unit while allowing said head unit to pivot with respect to said loading arm as said head unit follows variations in said record surface, (e) and a flat spring element fixedly attached at one end to said head unit and fixedly attached at the other end to said loading arm, that portion of said flat spring element adjacent the area over which said flat spring element is attached to said head unit lying in a plane substantially parallel to said hydrodynamic bearing surface and intersecting the area of contact between said first and second pivot bearing surfaces to restrain said head unit from rotation about an axis through said single universal pivot element perpendicular to said record surface.

2. An assembly for maintaining a magnetic recording head in close hydrodynamic bearing relationship to a record surface during relative motion between said head and said record surface comprising:

(a) a substantially rigid loading arm, said loading arm being pivotally mounted to a support member to allow pivotal movement of its free end toward and away from said record surface, (b) a pivot element having spherical surface protruding from said loading arm on the side of said loading arm toward said record surface, (c) a flat spring having a separate section connecting each side of head to said loading arm, each said section fixedly attached at one end to said recording head and fixedly attached at the other end to said loading arm, said spring having that portion of its area just adjacent each side of said head oriented to be in a plane intersecting that point of said spherical surface in contact with a plane surface on said head and operable to bias said plane surface of said head in load bearing contact with said spherical surface of said loading arm, said flat spring further being shaped to have a reduced section modulus in each section of said spring along an axis perpendicular to the direction of said relative motion and intersecting the point of contact between said spherical surface and said plane surface.

References Cited by the Examiner

UNITED STATES PATENTS

| | | | |
|---|---|---|---|
| 2,913,536 | 11/59 | Fuller et al. | 179—100.2 |
| 3,018,152 | 1/62 | Cowan | 346—74 |
| 3,071,773 | 1/63 | Haughton et al. | 346—74 |

OTHER REFERENCES

Pages 13 and 14—8/61, IBM Technical Disclosure Bulletin, vol. 4, No. 3.

BERNARD KONICK, *Primary Examiner.*

IRVING L. SRAGOW, *Examiner.*